United States Patent
Tang et al.

(10) Patent No.: US 6,274,080 B1
(45) Date of Patent: Aug. 14, 2001

(54) METHOD FOR PREPARING CERAMIC COMPOSITIONS

(75) Inventors: Xun Tang; Xianliang Wu, both of Dresher; Linda Katherine Molnar, Horsham, all of PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/313,766

(22) Filed: May 18, 1999

Related U.S. Application Data

(60) Provisional application No. 60/097,354, filed on Aug. 21, 1998.

(51) Int. Cl.$^7$ ............................... B28B 3/00; B28B 3/20
(52) U.S. Cl. ...................... 264/638; 264/667; 264/669; 264/680
(58) Field of Search .................. 264/642, 638, 264/669, 679, 680, 667

(56) References Cited

U.S. PATENT DOCUMENTS

| | | | |
|---|---|---|---|
| 3,770,563 | 11/1973 | Bobinski et al. | 161/162 |
| 4,083,824 | * 4/1978 | Harris | 260/42.29 |
| 4,902,459 | * 2/1990 | Matsubara et al. | . |
| 4,968,460 | 11/1990 | Thompson et al. | 264/6 |
| 5,549,123 | * 8/1996 | Okuyama et al. | 128/898 |
| 5,897,723 | * 4/1999 | Tatumoto et al. | 156/89.11 |

FOREIGN PATENT DOCUMENTS

650946 A1    5/1995   (EP) .

OTHER PUBLICATIONS

X. Kevin Wu, et al., *Ceram. Eng. Sci. Proc.*, vol. 18 (2), pp 422–438 (1997).
James S. Reed, *Principles of Ceramic Processing*, Second Ed., John Wiley and Sons, p 204 New York, 1995.
Whitman et al., "*Humidity Sensitivity of Dry Press Binders*," Paper No. SXVIIb—92–94, presented at the 96$^{th}$ Annual Meeting of the American Ceramic Society, Indianapolis, IN, Apr. 25, 1994.

* cited by examiner

*Primary Examiner*—Christopher A. Fiorilla
(74) *Attorney, Agent, or Firm*—Thomas J. Howell

(57) ABSTRACT

A method for providing improved compaction, green density, green strength and surface finish properties in simulated stone and mineral-like materials from ceramic green bodies, based on addition of selected polymer additives during ceramic processing, is disclosed. Polymer additives having weight-average molecular weights from 30,000 to 1,000,000, glass transition temperatures from –50 to +90° C., and low hygroscopicity are particularly useful in providing enhanced properties of ceramic products involving processing of large-size granule intermediates.

16 Claims, No Drawings

METHOD FOR PREPARING CERAMIC COMPOSITIONS

This application is based on provisional application No. 60/097,354 filed Aug. 21, 1998.

BACKGROUND

This invention relates to polymeric additives providing increased plasticity, density and strength in the formation of simulated natural substances, such as stone-like and mineral-like materials. In particular the present invention involves the use of specific polymers together with mineral matrix materials, to provide green bodies of ceramic compositions, such as ceramic tiles and ceramic tiles with a granite-like or marble texture, having improved compaction, green density, green strength and surface finish properties.

Ceramic materials are often used to prepare lightweight, strong, thermally and chemically resistant products useful as chromatographic media, grinding aids, abrasives, catalysts, adsorbents, tableware, tiles, electronic components, construction components and machine components.

There currently exists a need for ceramic materials that mimic the appearance of mineral-like materials, such as natural stone, and in particular granite or marble, for use in the manufacture of flooring, tiles, counter tops, sinks, spas, sanitaryware, architectural articles and other ornamental materials.

In the manufacture of ceramic tiles, ceramic materials in the form of a powder are subjected to elevated pressures to produce what is known as a green body. One of the methods for compacting, or subjecting the materials to elevated pressures, to produce ceramic green bodies is pressing. Pressing methods include dry pressing, isostatic pressing and semi-wet pressing. Using these methods, the green bodies can be prepared in various shapes and sizes. In dry pressing ceramic tiles, ceramic materials are first processed into a slurry, converted into granules and then compacted into green bodies having various shapes and sizes. In semi-wet pressing, ceramic materials are processed into a wet mix and compacted into green bodies having various shapes and sizes.

The properties of the green bodies generally affect the properties of the final ceramic tiles. The final product is typically prepared by sintering the green body. If the green density of the green body is too low, the mechanical properties of the final tiles, such as hardness and toughness, will diminish. If the green strength is too low, it becomes difficult or impossible to process the green body. Thus, it is desirable to provide ceramic green bodies with sufficient green densities and green strengths.

Green density is determined by how well the ceramic materials are compacted during processing. For example, in dry pressing, the green density is determined by the compaction of the granules. Compaction of granules can be improved by introducing plasticity into the granule composition.

Lack of plasticity in ceramic granules results in increased hardness of the granules. Increased hardness reduces compaction of the granules, and therefore reduces density of the green bodies after pressing; low green density results in a low fired density after sintering which reduces mechanical strength of the final ceramic product. Increased hardness of granules can also cause a rough surface finish in the pressed green bodies, introducing potential defects into the final ceramic product after sintering.

Plasticity becomes even more important in increasing green density and improving surface finish when the granule size is large; for example, large size granules are preferred in order to achieve a desired granite-like or marble texture in certain finished ceramic materials. With larger size granules, increased plasticity is required to compact the large granules into dense green bodies. This plasticity is crucial in pressing tiles with granite-like or marble texture in which the granules can be as large as a few millimeters (mm).

Green strength is equally important in the green bodies of ceramic tiles as it provides the necessary handling characteristics of the green bodies. Green strength can also be affected by the compaction of ceramic materials in the green bodies. Higher compaction results in higher green strength, other factors being equal.

One method for increasing compaction, thus increasing green density and green strength of ceramic green bodies, is to use a plasticizer as a processing aid in the preparation of the green bodies. Common plasticizers include water, ethylene glycols, polyethylene glycols, glycerol, dibutyl phthalate and dimethyl phthalate (James S. Reed, *Principles of Ceramic Processing,* Second Ed., John Wiley and Sons, p 204 New York, 1995). Those plasticizers are either water-soluble or water-insoluble. The water-insoluble plasticizers are not suitable for pressing of ceramic tiles since the plasticizers cannot be incorporated into a ceramic slurry that is water based. The water-soluble plasticizers are also less desirable since they are sensitive to changes in humidity, that is, they are hygroscopic. Thus, ceramic green bodies made by processes using these water-soluble plasticizers exhibit variability in compaction, green density, green strength, shrinkage and die sticking as the humidity varies (Whitman et al., *"Humidity Sensitivity of Dry Press Binders,"* Paper No. SXVIIb-92–94, presented at the 96th Annual Meeting of the American Ceramic Society, Indianapolis, Ind., Apr. 25, 1994). In addition, since the aforementioned plasticizers are either small molecules or very low molecular weight polymers, they provide little or no adhesion for ceramic powders during processing. The ceramic green bodies processed with these plasticizers have little strength.

U.S. Pat. No. 4,968,460 discloses several classes of emulsion polymers useful as binders for ceramic materials, including acrylate ester polymers, having glass transition temperatures from −100° C. to +120° C. These binders provide increased green strength and green density to the ceramic green bodies when the green body is subjected to an energy treatment step, such as electron beam irradiation, X-ray irradiation, ultraviolet radiation, heating treating from 50° C. to 200° C. or combinations of heat and pressure; the additional treatments add time and cost during production of ceramic green bodies.

The present invention seeks to overcome the problems involving the use of prior art additives in preparing ceramic compositions by using selected polymer additives having high molecular weight, low $T_g$ and low-hygroscopicity: the low $T_g$ ensures sufficient plasticization of the mineral matrix material and the high molecular weight/low-hygroscopicity properties provide sufficient green strength.

STATEMENT OF INVENTION

The present invention provides a method for preparing a ceramic composition comprising (a) forming a particulate material mixture comprising 0.1 to 20 weight percent of polymer additive, based on total weight of the mixture, and at least 40 weight percent of mineral matrix material, in the form of granules having a particle size of 0.5 to 10 millimeters; (b) compacting the granules to form a green body;

and (c) sintering the green body; wherein the polymer additive is selected from one or more polymers having a weight-average molecular weight from 30,000 to 1,000,000, a hygroscopicity of less than 6 percent moisture absorbed based on weight of polymer additive, and a glass transition temperature from −50 to +90° C. Preferably, the green body has flat-sheet dimensions of at least 10 centimeters in width by at least 10 centimeters in length by at least 0.2 centimeters in thickness.

The present invention further provides a method as described above wherein step (a) is repeated from two to five times, using a different matrix material for each particulate material mixture of granules, followed by step (b), wherein each of the different particulate material mixture of granules is fed into a compacting device; and further comprising at least one of the particulate material mixtures having an average particle size of less than 0.5 millimeters.

In another embodiment, the present invention provides a green body composition for use in ceramic compositions comprising (a) 50 to 99.9 weight percent, based on total weight of the green body composition, of mineral matrix material; and (b) 0.1 to 20 weight percent, based on total weight of the green body composition, of polymer additive selected from one or more polymers having a weight-average molecular weight from 30,000 to 1,000,000, a hygroscopicity of less than 6 percent moisture absorbed based on weight of polymer additive, and a glass transition temperature of −50 to +90° C.

DETAILED DESCRIPTION

The process of the present invention is useful for preparing a range of ceramic compositions, including ceramic tiles, suitable for use in forming simulated mineral-like articles. We have discovered that the use of selected polymer additives in formulating the green body compositions involved in the ceramic processing steps results in improved compaction of large-size granules, improved green density and improved green strength of intermediates and green body compositions.

As used herein, the term "particulate material" refers to any material in the form of separate particles or divided fragments, such as, for example, pellets, beads, powders, granules and chips.

As used herein, the term "alkyl (meth)acrylate" refers to either the corresponding acrylate or methacrylate ester; similarly, the term "(meth)acrylic" refers to either acrylic or methacrylic acid and the corresponding derivatives, such as esters or amides; and acryloyl and methacryloyl are referred to as "(meth)acryloyl." As used herein, all percentages referred to will be expressed in weight percent (%), based on total weight of polymer or composition involved, unless specified otherwise. As used herein, the term "copolymer" refers to polymer compositions containing units of two or more monomers or monomer types. "Emulsion-form polymer" as used herein refers to a water-insoluble polymer that is prepared by emulsion polymerization techniques.

"Glass transition temperature," or "$T_g$," as used herein, means the temperature at or above which a glassy polymer will undergo segmental motion of the polymer chain. Glass transition temperatures of a polymer can be estimated by the Fox equation (Bulletin of American Physics Society, 1 (3), p 123, 1956) as follows:

$$\frac{1}{T_g} = \frac{w_1}{T_{g(1)}} + \frac{w_2}{T_{g(2)}}$$

For a copolymer, $w_1$ and $w_2$ refer to the weight fraction of the two comonomers, and $T_{g(1)}$ and $T_{g(2)}$ refer to the glass transition temperatures of the two corresponding homopolymers. For polymers containing three or more monomers, additional terms are added ($w_n/T_{g(n)}$). The $T_g$ of a polymer can also be measured by various techniques including, for example, differential scanning calorimetry (DSC).

Polymeric additives suitable for use in the method of this invention have a glass transition temperature within the range of −50° C. to +90° C., preferably from −50° C. to +50° C., more preferably from −40 to +40° C., even more preferably from −40 to 0° C., and most preferably from −35° C. to −5° C.

The polymer additives useful in the present invention have a weight average molecular weight ($M_w$) of 30,000 to 1,000,000, preferably from 50,000 to 500,000, and more preferably from 100,000 to 300,000. Weight average molecular weights are based on gel permeation chromatography (GPC) analysis using known polymer standards appropriate for the polymer compositions involved.

The polymer additives are selected from those having a low hygroscopicity, that is, less than 6%, and preferably less than 4%, moisture absorbed based on weight of the polymer additive. Polymer additives that are more hydrophilic, that is, highly hygroscopic, for example, those having hygroscopicity values of greater than 10% moisture absorbed based on weight of polymer additive, are more likely to cause handling problems during formation of the ceramic green body in tile-form; variability in compaction, green density, green strength, shrinkage and die sticking are common problems when hydrophilic additives are used. Hygroscopicity may be determined by various conventional methods, such as those described in "Humidity Sensitivity of Dry Press Binders," Paper No. SXVIIb-92–94, by Whitman et al., presented at the 96$^{th}$ Annual Meeting of the American Ceramic Society, Indianapolis, Ind., Apr. 25, 1994, or in U.S. Pat. No. 3,770,563. Hygroscopicity values for the polymer additives may be obtained by equilibrating the additives under controlled humidity conditions at ambient temperature conditions, for example 24–72 hours, until constant weight is obtained and measuring the moisture uptake; moisture absorption values (weight % based on polymer additive) would be typically measured at relative humidities of 60–95%, preferably 70–90%.

Any polymer having the required $T_g$, $M_w$ and hygroscopicity properties disclosed above is suitable for use in the method of the present invention. While not wishing to be bound by theory, we believe that, in the case of the present invention, the low $T_g$ provides enhanced plasticization of the mineral matrix material and the high molecular weight and low-hygroscopicity properties provide enhanced green strength of the resultant green body composition. The polymer additives may be prepared by any of the conventional methods known for polymerization: bulk, suspension, solution or emulsion techniques. Water-insoluble vinyl polymers are particularly preferred; especially preferred are emulsion-form polymers since they provide insensitivity to humidity of granule intermediates as well as the resultant green body composition during processing.

Preferred polymer additives useful in the method of the present invention include, for example, acrylic polymers and copolymers formed from alkyl (meth)acrylate esters such as, for example, methyl acrylate, ethyl acrylate, propyl acrylate, isopropyl acrylate, butyl acrylate, isobutyl acrylate, secondary butyl acrylate, t-butyl acrylate, pentyl acrylate, neopentyl acrylate, hexyl acrylate, heptyl acrylate, octyl acrylate, isooctyl acrylate, 2-ethylhexyl acrylate, decyl acrylate, isodecyl acrylate, lauryl acrylate, bornyl acrylate, isobornyl acrylate, myristyl acrylate, pentadecyl acrylate, stearyl acrylate, methyl methacrylate, ethyl methacrylate, propyl methacrylate, isopropyl methacrylate, butyl methacrylate, isobutyl methacrylate, hexyl methacrylate, octyl methacrylate, isooctyl methacrylate, decyl methacrylate, isodecyl methacrylate, lauryl methacrylate, bornyl methacrylate, isobornyl methacrylate, myristyl methacrylate, pentadecyl methacrylate and stearyl methacrylate. Preferred (meth)acrylate esters include methyl acrylate, ethyl acrylate, butyl acrylate, 2-ethylhexyl acrylate, methyl methacrylate, butyl methacrylate, isodecyl methacrylate and lauryl methacrylate.

The polymeric additives useful in the present invention may contain, as polymerized units, up to 20%, preferably from zero to 10% and more preferably from 0.5 to 7%, of one or more acid-containing monomers. Suitable acid-containing monomers include ethylenically unsaturated carboxylic acids, such as acrylic acid, methacrylic acid, itaconic acid, maleic acid, fumaric acid, and the alkali metal and ammonium salts thereof. Preferred acid-containing monomers are acrylic acid, methacrylic acid, itaconic acid and the alkali metal and ammonium salts thereof.

Preferred polymeric additives useful in the present invention may contain, as polymerized units, up to 70%, preferably up to 30% and more preferably from zero to 20%, of one or more vinyl or vinylidene monoaromatic monomers. Suitable vinyl or vinylidene monoaromatic monomers include, for example, styrene, and styrene that is substituted on the aromatic ring with one or more ($C_1$–$C_4$)alkyl radicals, hydroxyl radicals, chlorine atoms or bromine atoms. Preferably, the vinyl or vinylidene monoaromatic monomer is styrene, α-methyl styrene, chlorostyrene or vinyl phenol, and is more preferably styrene.

Preferred polymeric additives useful in the present invention may contain, as polymerized units, up to about 10% of one or more other copolymerizable monomers. Suitable other copolymerizable monomers include, for example, butadiene, acrylonitrile, ethylene, vinyl acetate, hydroxyalkyl (meth)acrylates, amides of $C_3$–$C_6$ ethylenically unsaturated carboxylic acids, amides of $C_3$–$C_6$ ethylenically unsaturated carboxylic acids that are substituted at the nitrogen by one or two ($C_1$–$C_4$)alkyl groups, acrylamide, methacrylamide and N-methylol (meth)acrylamide.

Preferably, the polymer additives of the present invention include, for example, polymers comprising as polymerized units (i) from 20 to 98% of one or more ($C_1$–$C_{20}$)alkyl (meth)acrylate monomers, (ii) from 0 to 20% of one or more unsaturated carboxylic acid monomers, and (iii) from 0 to 70% of one or more unsaturated vinyl or vinylidene monoaromatic monomers. More preferably, the polymer additives are based on polymers comprising as polymerized units (i) from 50 to 98% of one or more ($C_1$–$C_4$)alkyl (meth)acrylate monomers, (ii) from 1 to 10% of one or more unsaturated carboxylic acid monomers, and (iii) from 0 to 30% of one or more unsaturated vinyl or vinylidene monoaromatic monomers; preferably, these polymer additives also have a weight-average molecular weight from 50,000 to 500,000 and a glass transition temperature from −40 to +40° C. Most preferably, the ($C_1$–$C_4$)alkyl (meth) acrylate monomer is 60 to 90% butyl acrylate and 10 to 15% methyl methacrylate; the unsaturated carboxylic acid monomer is 1 to 5% of one or more of acrylic acid and methacrylic acid; and the vinyl monoaromatic monomer is zero to 20% styrene.

Preferably, green body compositions for use in ceramic compositions comprise (a) 50 to 99.9 weight percent, based on total weight of the green body composition, of mineral matrix material; and (b) 0.1 to 20 weight percent, based on total weight of the green body composition, of polymer additive selected from one or more polymers comprising as polymerized units from 50 to 98 weight percent of one or more ($C_1$–$C_4$)alkyl (meth)acrylate monomers, from 1 to 10 weight percent of one or more unsaturated carboxylic acid monomers, and from zero to 20 weight percent of one or more unsaturated vinyl or vinylidene monoaromatic monomers, based on total weight of the polymer; and wherein the polymer additive has a weight-average molecular weight from 50,000 to 500,000 and a glass transition temperature from −40 to +40° C. Preferably, the green body composition comprises 75 to 99 weight percent mineral matrix material and 0.1 to 10 weight percent polymer additive.

Additional polymer additives suitable for use in the process of the present invention include, for example, polymers comprising as polymerized units both hydrophilic and hydrophobic moieties, that is, hydrophobically-modified polymers (HMP). This class of polymers (HMP) would typically include hydrophobically-modified polyalkyleneoxides, hydrophobically-modified polyvinyl alcohols or acetates, hydrophobically-modified cellulosics, hydrophobically-modified nonionic polyols and hydrophobically-modified alkali-soluble (or swellable) emulsion polymers. Suitable HMP polymer additives must satisfy the required $T_g$ and $M_w$ properties disclosed above; in addition, the hydrophobic modification aspect of these polymers would be further directed to satisfying the "low-hygroscopicity" property of the polymer additives.

Suitable hydrophobically-modified cellulosics include, for example, cellulose derivatives that have been modified with hydrophobic groups; the hydrophobic groups are typically introduced by well known methods to functionalize some portion of the free hydroxyl groups in the cellulose polymer, for example, by esterification with acids such as acetic acid, stearic acid or oleic acid.

Suitable hydrophobically-modified nonionic polyols include, for example, polyetherurethanes (or polyalkoxylated urethanes) that are condensation polymers of polyether polyols and isocyanates.

Suitable hydrophobically-modified alkali-soluble emulsion polymers include, for example, acrylic carboxylate emulsion polymers that are formed from an unsaturated carboxylic acid, a (meth)acrylic acid ester of an alkoxylated hydrocarbyl or complex hydrophobe alcohol, a nonionic ($C_2$–$C_{12}$) unsaturated monomer and optionally one or more polyethylenically unsaturated monomers or chain transfer agents.

Raw mineral matrix materials useful in the method of the present invention, include, for example, shales, stoneware clay, tile clay, crude bauxite, crude kyanite, natural ball clay, bentonite, ball clay, kaolin, calcined kaolin, refined bentonite, pyrophyllite, talc, feldspar, nepheline syenite, wollastonite, spodumene, glass sand, potter's flint (quartz), kyanite, bauxite, zircon, rutile, chrome ore, dolomite, alumina, zirconia, zirconates, silica, titania, titanates, cordierite, iron oxides, ferrites and kaolinites. The preferred mineral matrix materials are selected from one or more of shale, stoneware clay, tile clay, crude bauxite, crude kyanite, natural ball clay, bentonite, ball clay, kaolin and kaolinites.

Optionally, the raw mineral matrix materials may be mixed with conventional adjuvants, known to those skilled in the art, for various purposes, for example: dispersants, inert fillers, pigments, and processing aids (such as spray drying aids, lubricants and mold-release agents). Conventional pigments (colorants) include inorganic minerals (such as, for example, cadmium, chromates, iron blue, cobalt blue and ultramarine blue). In addition, these same conventional adjuvants may be conveniently added at later stages in the production of the ceramic composition, for example, during formation of the particulate material mixture, dewatering step or as part of the compaction step. When present, the amount of optional adjuvants is typically from 0.05 to 50%, preferably from 0.1 to 20%, and more preferably from 0.5 to 10%, based on total weight of the green body composition, of adjuvants selected from one or more of dispersant, inert filler, pigment and processing aids.

The ceramic compositions may be produced by converting raw mineral matrix materials to a fine powder form by conventional means (such as ball-milling or agitation) and dispersing the powdered matrix material in water in the presence of conventional dispersants (such as polyacrylate salts or sodium pyrophosphate) to provide a mixture, typically in the form of a slurry or wet mix; optionally, inorganic pigment additives may be included in the preparation of this mixture. The mixture typically contains at least 40%, preferably 50 to 99% and more preferably 75% to 99%, mineral matrix material, based on total weight of the mixture. The slurry or wet mix is then mixed with the polymer additive by any conventional mixing method (such as mechanical stirring or kneading). The particulate material mixture typically contains 0.1 to 20%, preferably 0.1 to 10% and more preferably 0.5 to 5%, polymer additive, based on total weight of the mixture. The resultant mixture is either dewatered in the case of a slurry or granulated in the case of a wet mix to a granular particulate material having an average size of less than 0.5 mm. Typical dewatering procedures include, for example, spray drying.

Additional batches of particulate material mixtures containing the polymer additive and any optional adjuvants may be prepared in a similar fashion; different mineral matrix materials may be used for each additional batch. For each of the additional particulate material mixtures having an average size of less than 0.5 mm, the granules may be optionally further "agglomerated" in a separate step where the agglomerated product is in the form of particles having a final average particle size of 0.5 to 10 mm, preferably from 1 to 7 mm and more preferably from 2 to 5 mm.

The particulate material granules may be further comminuted to a specific particle size material (as indicated above) by known processes, for example, chipping, crushing, grinding, shredding or any granulation method.

The granules are fed into a compacting device to compress the granules into green bodies. Suitable compacting methods include, for example, dry pressing, isostatic pressing, semi-wet pressing, roll compaction and extrusion; preferably, the green bodies are produced by dry-pressing. The compacting step is typically conducted at ambient temperature, that is, no external heat provided. Preferably the ceramic green body is formed from the ceramic mixture by dry pressing at room temperature at a pressure of at least 6.9 megaPascals or MPa (1,000 pounds per square inch or psi), and more preferably from 13.8 MPa (2,000 psi) to 345 MPa (50,000 psi). The resulting green body preferably has a green strength of at least 0.1 and more preferably at least 0.2 MPa.

The compacting step produces a green body in a "flat-sheet" conformation suitable for providing a finished product useful in tile-form; dimensions of the flat-sheet green body are at least 10 centimeters (cm) in width by at least 10 cm in length by at least 0.2 cm in thickness; preferably the flat-sheet width or length dimensions are at least 20 cm, more preferably at least 30 cm and most preferably at least 40 cm; preferably the flat-sheet thickness dimensions are at least 0.2 cm, more preferably at least 0.4 cm and most preferably at least 0.5 cm. It is highly desirable to to be able to manufacture ceramic tiles with a natural-stone texture, such as those having granite-like or marble textures, in large sheet/tile conformations. The process of the present invention is particularly suited to providing the green strength necessary to process large-sheet green bodies based on a heterogeneous mixture of large and small particles.

The resultant green bodies are then optionally subjected to a drying step to remove residual moisture, followed by a sintering step in a kiln (typical temperatures of 1100° C. to 1500° C.) to produce the ceramic product. Optionally, the green body is further processed (such as cutting and polishing) to provide the final ceramic article, such as ceramic tiles having a natural-stone texture, for example, those having granite-like or marble textures. Ceramic articles, such as tiles, provided by the processs of the present invention can be used for indoor or outdoor applications, such as flooring, wall covering, spa, sanitary ware, countertops, bathroom and kitchen fixtures.

Some embodiments of the invention are described in detail in the following Examples. All ratios, parts and percentages (%) are expressed by weight unless otherwise specified, and all reagents used are of good commercial quality unless otherwise specified.

EXAMPLE 1/1A

Procedure for Preparing Ceramic Mixtures (No Polymer Additive)

Ceramic mixtures were prepared in the following manner: to a 1000-ml beaker was added 208.6 grams deionized water (including any processing additives). While stirring at 50 rpm with an overhead mixer, 490 grams of Jesse Shirly Fine China Clay was added to the beaker over 20 minutes. The ceramic mixture was then stirred for an additional 2 hours. The mixture was concentrated by evaporation (with stirring) of the water using a hot plate until stirring became difficult; the ceramic slurry was then placed on a flat surface and allowed to dry for 10–15 hours. The air-dried ceramic particles were then screened using conventional sieving screens into small and large particle size fractions (1=0.075 mm average size; 1A=6.3 mm average size).

EXAMPLE 2/2A

Using the procedure of Example 1, 5.0 grams of Polymer 1 (on a solids basis) was added to the beaker after the addition of the Jesse Shirly Fine China Clay. The resultant air-dried ceramic particles contained 1% by weight of Polymer 1 (2=0.075 mm average size; 2A=6.3 mm average size).

EXAMPLE 3/3A

Using the procedure of Example 1, 5.0 grams of Polymer 2 (on a solids basis) was added to the beaker after the addition of the Jesse Shirly Fine China Clay. The resultant air-dried ceramic particles contained 1% by weight of Polymer 2 (3=0.075 mm average size; 3A=6.3 mm average size).

EXAMPLE 4

Evaluation of Green Strength and Green Density

A 28.9 mm diameter hardened steel die with polished surfaces was used to prepare the green body in pellet form for evaluation of green strength and green density. A 15 gram sample of ceramic mixture was loaded into the die and compacted for 15 seconds to a pressure of 34.38 MPa (5,000 psi) to form the ceramic green body (approximately 28 mm diameter by 12 mm thickness).

The green strength of the ceramic green bodies was evaluated by measuring the green tensile strength using a diametrical compression test. Green tensile strength is calculated by the following formula:

$$\sigma_F = \frac{2 \cdot p}{\pi \cdot D \cdot L}$$

where $\sigma_F$ is the tensile strength, p is the applied load at failure, D is the diameter of the sample and L is the thickness of the sample. Diametrical compression tests were conducted to determine the applied load at failure using a Soiltest ® G-900 Versa-loader equipped with a 22.68 kilogram (50 pound) electronic force gauge (available from Ametek) operated at a loading rate of 0.013 cm (0.005 inch) per minute until the sample fractured. The green strength values (MPa) reported in Table I below are the average of four measurements.

The densities of the ceramic green bodies reported in Table I below are based on an average of four measurements and are reported in units of grams per cubic centimeter (g/cm³). The green densities ($\rho_{measured}$) were calculated in the following manner:

$$\text{mass/volume} = \rho_{measured}$$

The polymer additives had the following compositions and properties:

Polymer 1: emulsion polymer of 85% butyl acrylate, 12% methyl methacrylate, 1.6% methacrylic acid and 1% ethyleneureamethacrylate; $T_g = -26°$ C.

Polymer 2: emulsion polymer of 33% ethylhexyl acrylate, 63% styrene and 4% acrylic acid; $T_g = +40°$ C.

The data in Table I show the green density and green strength for the ceramic mixtures.

TABLE 1

| Example* | Green Density (g/cm³, 25° C.) | Green Strength (MPa, 25° C.) | Particle Size (mm) |
|---|---|---|---|
| 1 | 1.81 | 0.13 | 0.075 |
| 1A | 1.85 | 0.094 | 6.3 |
| 2 | 1.85 | 0.155 | 0.075 |
| 2A | 1.87 | 0.120 | 6.3 |
| 3 | 1.86 | 0.348 | 0.075 |
| 3A | 1.86 | 0.295 | 6.3 |

* 1, 1A without polymer additive; 2, 2A with polymer additive 1; 3, 3A with polymer additive 2.

For green bodies produced from small particle size granules, the green strength is generally satisfactory for the subsequent processing steps (for example, sintering, cutting and polishing). However, the green strength decreases dramatically (25% or more) when large particle size granules are used to provide the green body in the absence of polymer additives of the present invention. The effect of increasing the particle size of the granules used to form the green body in the absence of any polymer additive is illustrated by the results of Example 1 (1 versus 1A): there is a 28% decrease in green strength when the large particle granules are used. However, when the green body is produced from granules containing either Polymer 1 or Polymer 2 as an additive, the negative effect of increased particle size is considerably reduced, resulting in green bodies having satisfactory green strength: in the presence of Polymer 1, there is only a 23% decrease in green strength when the large particle size granules are used (Example 2 versus 2A); in the presence of Polymer 2, there is only a 15% decrease in green strength when the large particle size granules are used (Example 3 versus 3A). These changes in green strength correspond to a significant increase (over 800%) in size in going from small (0.075 mm) to large (6.3 mm) particle size granules used to provide the green bodies.

The effect of the additives (Polymers 1 and 2) on green strength for green bodies formed from large particle size granules (2A versus 1A, 3A versus 1A=+28% and +214%, respectively) is significantly greater than that observed for the smaller size granules (2 versus 1, 3 versus 1=+19% and +168%, respectively). The beneficial effect of the polymer additives used in the present invention is to enable a manufacturer to produce ceramic tiles with a natural-stone texture in large sheet/tile conformations with a great variety of natural-stone patterns, such as those having granite-like or marble textures, with a reduced "scrap" or "waste" rate and reduced breakage during handling.

We claim:

1. A method for preparing a ceramic composition comprising:
   (a) forming a particulate material mixture comprising 0.1 to 20 weight percent of polymer additive, based on total weight of the mixture, and at least 40 weight percent of mineral matrix material, in the form of granules having an average particle size of 1 to 7 millimeters;
   (b) compacting the granules to form a green body; and
   (c) sintering the green body; wherein the polymer additive is selected from one or more polymers having a weight-average molecular weight from 30,000 to 1,000,000, a hygroscopicity of less than 6 percent moisture absorbed based on weight of polymer additive, and a glass transition temperature from −50 to +90° C.

2. The method of claim 1 wherein the mineral matrix material is selected from one or more of shale, stoneware clay, tile clay, crude bauxite, crude kyanite, natural ball clay, bentonite, ball clay, kaolin and kaolinites.

3. The method of claim 1 wherein the polymer additive has a glass transition temperature from −40 to +40° C.

4. The method of claim 1 wherein the polymer additive is selected from one or more polymers comprising as polymerized units from 50 to 98 weight percent of one or more ($C_1$–$C_4$)alkyl (meth)acrylate monomers, from 1 to 10 weight percent of one or more unsaturated carboxylic acid monomers, and from zero to 30 weight percent of one or more unsaturated vinyl or vinylidene monoaromatic monomers, based on total weight of the polymer and wherein the polymer additive has a glass transition temperature from −40 to 0° C.

5. The method of claim 4 wherein the ($C_1$–$C_4$)alkyl (meth)acrylate monomer is 60 to 90 weight percent butyl acrylate and 10 to 15 weight percent methyl methacrylate; the unsaturated carboxylic acid monomer is 1 to 5 weight percent of one or more of acrylic acid and methacrylic acid; and the vinyl monoaromatic monomer is zero to 20 weight percent styrene.

6. The method of claim 1 wherein the particulate material mixture is initially isolated as granules having an average particle size of less than 0.5 millimeters, followed by agglomerating the particles to a final average particle size of 1 to 7 millimeters.

7. The method of claim 1 wherein step (a) is repeated from two to five times, using a different matrix material for each particulate material mixture of granules, followed by step (b), wherein each of the different particulate material mixture of granules is fed into a compacting device; and further comprising at least one of the particulate material mixtures having an average particle size of less than 0.5 millimeters.

8. The method of claim 1 wherein the green body is further processed into a ceramic tile having a natural-stone texture.

9. The method of claim 1 wherein the green body has flat-sheet dimensions of at least 10 centimeters in width by at least 10 centimeters in length by at leas 0.2 centimeters in thickness.

10. The method of claim 9 wherein the flat-sheet dimensions of the formed green body are at least 40 centimeters in width and at least 40 centimeters in length.

11. The method of claim 1 wherein the polymer additive has a weight-average molecular weight from 50,000 to 500,000.

12. The method of claim 1 wherein the particulate material mixture is prepared as an aqueous slurry, followed by dewatering to form the granules.

13. The method of claim 1 wherein the particulate material mixture is prepared as a wet mix, followed by granulating to form the granules.

14. The method of claim 1 wherein the compacting step (b) is selected from the group consisting of dry pressing, isostatic pressing, semi-wet pressing, roll compaction and extrusion.

15. The method of claim 1 wherein the polymer additive is selected from one or more hydrophobically-modified polyalkyleneoxides, hydrophobically-modified polyvinyl alcohols or acetates, hydrophobically-modified cellulosics, hydrophobically-modified noninic polyols and hydrophobically-modified alkali-soluble emulsion polymers.

16. A method for preparing a ceramic composition comprising:

(a) forming a particulate material mixture comprising 0.1 to 20 weight percent of polymer additive, based on total weight of the mixture, and at least 40 weight percent of mineral matrix material, in the form of granules having an average particle size of 1 to 7 millimeters;

(b) compacting the granules to form a green body; and (c) sintering the green body; wherein the polymer additive is selected from one or more polymers having a weight-average molecular weight from 30,000 to 1,000,000, a hygroscopicity of less than 6 percent moisture absorbed based on weight of polymer additive, and a glass transition temperature from −40 to 0° C.

* * * * *